United States Patent
Gao et al.

(10) Patent No.: US 8,125,227 B2
(45) Date of Patent: Feb. 28, 2012

(54) CONTROLLING METHOD FOR CAPACITIVE SENSORS

(75) Inventors: Yunfeng Gao, Shenzhen (CN); Kesheng Chen, Shenzhen (CN)

(73) Assignee: Shenzhen Han's Laser Technology Co., Limited, Shenzhen (CN)

( * ) Notice: Subject to any disclaimer, the term of this patent is extended or adjusted under 35 U.S.C. 154(b) by 561 days.

(21) Appl. No.: 12/088,581

(22) PCT Filed: Aug. 10, 2006

(86) PCT No.: PCT/CN2006/002022
§ 371 (c)(1),
(2), (4) Date: Mar. 28, 2008

(87) PCT Pub. No.: WO2008/006254
PCT Pub. Date: Jan. 17, 2008

(65) Prior Publication Data
US 2008/0218182 A1  Sep. 11, 2008

(30) Foreign Application Priority Data
Jun. 30, 2006  (CN) .......................... 2006 1 0036314

(51) Int. Cl.
*G01V 3/00* (2006.01)
(52) U.S. Cl. ........................ 324/322; 324/300
(58) Field of Classification Search .................. 324/676, 324/686, 300, 309, 322, 318, 307; 323/260; 318/687, 653, 135, 159; 335/275, 276, 256, 335/279, 270
See application file for complete search history.

(56) References Cited

U.S. PATENT DOCUMENTS

| 4,793,187 | A | | 12/1988 | Kordts | |
|---|---|---|---|---|---|
| 4,878,211 | A | * | 10/1989 | Suzuki et al. | 369/44.35 |
| 5,347,843 | A | * | 9/1994 | Orr et al. | 73/1.34 |
| 5,621,293 | A | | 4/1997 | Gennesseaux | |
| 5,623,432 | A | * | 4/1997 | Degrauwe | 713/321 |
| 5,757,149 | A | * | 5/1998 | Sato et al. | 318/135 |
| 5,798,748 | A | * | 8/1998 | Hilton et al. | 345/156 |
| 6,132,386 | A | * | 10/2000 | Gozani et al. | 600/554 |
| 6,243,641 | B1 | * | 6/2001 | Andrews et al. | 701/102 |

(Continued)

FOREIGN PATENT DOCUMENTS

CN  1551988  12/2004

(Continued)

OTHER PUBLICATIONS

International Search Report issued for PCT/CN2006/002022, dated Mar. 29, 2007; 3 pages.

*Primary Examiner* — Brij Shrivastav
(74) *Attorney, Agent, or Firm* — Fulbright & Jaworski L.L.P.

(57) ABSTRACT

A controlling method for capacitive sensors in a vibrating mirror motor system includes a capacitive sensor, a subtraction circuit and an adder circuit connected to the capacitive sensor, a high frequency power supply providing power for the capacitive sensor, a D/A converter, and a gain stage adjustment device, wherein values obtained at the capacitive sensor are summed through the adder circuit, then the summed value and a value processed by the D/A converter are input to a comparator which comparing the values, and a gain adjusting value is obtained and supplied to the high frequency power supply, meanwhile the values obtained by capacitive sensor are subtracted by the subtraction circuit and then adjusted by the gain stage adjustment device, finally a position signal is outputted.

10 Claims, 2 Drawing Sheets

U.S. PATENT DOCUMENTS

| | | | |
|---|---|---|---|
| 6,492,911 B1 * | 12/2002 | Netzer | 340/870.37 |
| 6,525,546 B1 * | 2/2003 | Zhao et al. | 324/658 |
| 6,731,121 B1 | 5/2004 | Hsu et al. | |
| 6,917,049 B2 * | 7/2005 | Krah et al. | 250/559.1 |
| 7,024,948 B2 * | 4/2006 | Eilersen | 73/862.627 |
| 7,038,414 B2 * | 5/2006 | Daniels et al. | 318/466 |
| 7,130,026 B2 * | 10/2006 | Sugawara et al. | 355/72 |
| 7,132,642 B2 * | 11/2006 | Shank et al. | 250/221 |
| 7,312,591 B2 * | 12/2007 | Washeleski et al. | 318/280 |
| 2003/0151382 A1 | 8/2003 | Daniels et al. | |
| 2005/0209828 A1 * | 9/2005 | Blosser et al. | 702/190 |

FOREIGN PATENT DOCUMENTS

| | | |
|---|---|---|
| JP | 57-171212 | 10/1982 |
| JP | 59-009714 | 1/1984 |

* cited by examiner

CONTROLLING METHOD FOR CAPACITIVE SENSORS

FIELD OF THE INVENTION

This invention relates to a method for controlling a sensor in particular to a method for controlling a digital gain capacitive sensor.

THE RELATED ART

A capacitive sensor is a common sensitive sensor. A differential capacitive sensor is a capacitive sensor with relatively better performance and is widely applied to servomotor of galvanometers. Usually, subtraction is performed between the values obtained at two differential pole-pairs to obtain the difference. Furthermore, the sum of the values obtained at the two differential pole-pairs is controlled as a constant to counteract the drifts resulting from temperature change. FIG. 1 shows the control block diagram of the traditional method. In the traditional system, the values obtained at two pole-pairs of a differential capacitive sensor are summed by an adder circuit 2 to get a voltage value. The voltage value is compared with a voltage output from a precision voltage source 4 in a comparator circuit 3. The output of the comparator circuit 3 controls the energy supplied to the capacitive sensor 1 by the high-frequency power supply 5, so that the sum of the values mentioned above keeps constant, thereby counteracting drifts resulted from environmental changes such as temperature change. In order to match an external control interface, subtraction is performed between the values obtained at the two differential pole-pairs of the capacitive sensor 1 in a subtraction circuit 6, and the voltage value resulted from the subtraction is further adjusted through a gain adjustment circuit 7 to get an output position signal.

Such a structure has the following disadvantages:

1. The gain adjustment circuit employs a potentiometer to perform gain adjustment. This may produce greater drift because it is very difficult and expensive to realize precision low temperature drift with a potentiometer. Only few manufacturers around the world can make such kind of potentiometers.

2. A potentiometer requires manual adjustment, which takes time and efforts, and the adjustment precision is low and arbitrary. A precision potentiometer of low temperature drift has a short lifetime for adjustment, and is easily damaged with increasing number of adjustment times.

SUMMARY OF THE INVENTION

The present invention provides a method for controlling a capacitive sensor. Controlling a capacitive sensor with this method may achieve adjustment of high precision and low temperature drift in environments with high requirement like a servomotor of a vibrating mirror.

In accordance with the present invention, there is provided a method for controlling a capacitive sensor in a vibrating mirror motor system comprising a capacitive sensor, a subtraction circuit and an adder circuit connected with the capacitive sensor, a high-frequency power supply for providing energy to the capacitive sensor, a digital-to-analog converter (DAC) and a gain stage adjuster. Values obtained by the capacitive sensor are summed with the adder circuit. The value resulted from the adder circuit is input to a comparator circuit together with a value processed by the DAC. A gain adjustment value obtained through the comparison in the comparator circuit is provided to the high-frequency power supply. The subtraction circuit performs subtraction on the values obtained by the capacitive sensor, and the result is adjusted with the gain stage adjuster, and the gain stage adjuster outputs a position signal.

The capacitive sensor includes one or more differential capacitor pole-pairs.

The capacitive sensor includes a common energy emission source surface, a displacement detection area, and an intermediate medium related to the displacement. The intermediate medium is ceramic.

A microprocessor is connected to a computer and is controlled by the computer.

A digital potentiometer is employed in the gain stage adjuster. The digital potentiometer is connected to the microprocessor, and the microprocessor sets a stage coefficient of the digital potentiometer.

The DAC is connected respectively to a precision voltage source and the microprocessor. The voltage value set in the microprocessor and the voltage value provided by the precision voltage source are input into the DAC for processing.

In the present invention, the traditional precision reference voltage source is replaced with a DAC, and the gain adjustment circuit is replaced with a high-stable digital gain stage adjuster, thereby achieving adjustment of high precision and low temperature drift. The solution of digital adjustment enables adjustment through a computer, thereby reducing labor intensity and arbitrariness of manual adjustment.

BRIEF DESCRIPTION OF THE DRAWINGS

The present invention will be described with reference to the accompanying drawings, in which.

DETAILED DESCRIPTION OF THE PREFERRED EMBODIMENT

The present invention is an innovative method for controlling a displacement and rotary-angle differential capacitive sensor employed in a vibrating mirror system. The method is characterized in that after summation is performed using sensing areas of a capacitive sensor, and then gain control is performed using a DAC, which realizes gain control of low temperature drift without using ultra-precision manual adjusted potentiometer, and also provides digital interfaces for control.

Figure 1:
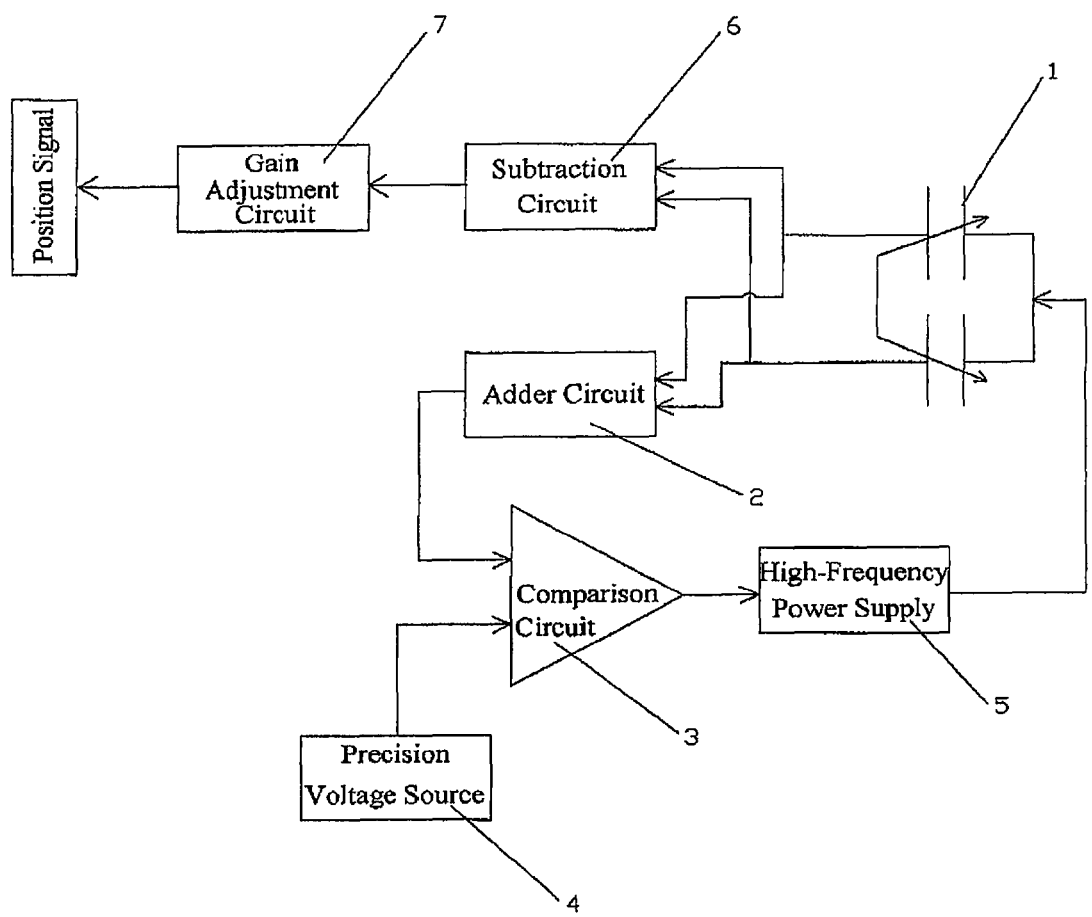
FIG. 1 is a working flow diagram of the prior art.
Figure 2:
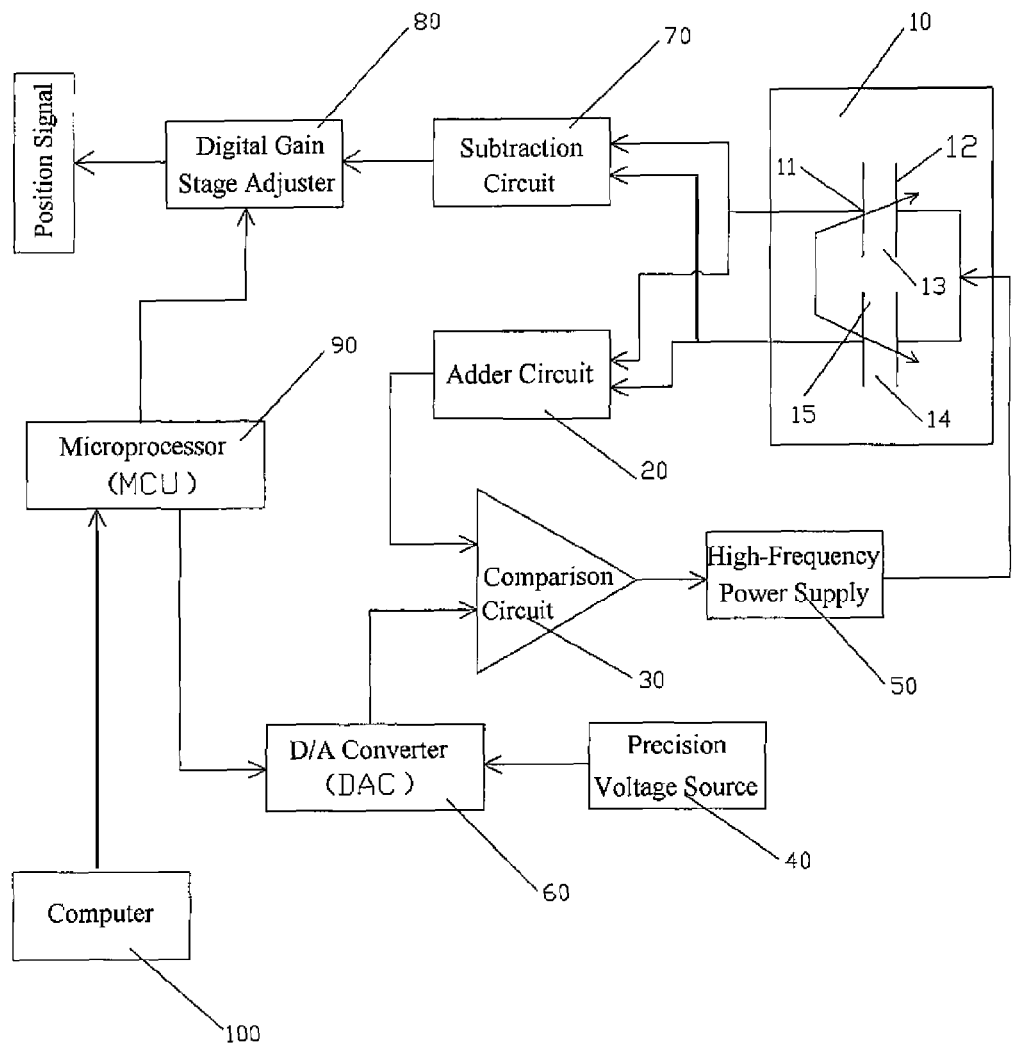
FIG. 2 is a working flow diagram of the present invention.

Referring to FIG. 2, a capacitive sensor 10 of the present invention includes two differential capacitor pole-pairs 1. The pair includes a common energy emission source surface 12, two electrically independent displacement detection areas 13 and 14, and an intermediate medium 15 that is related to the displacement. In the present invention, the intermediate medium 15 is ceramic. The capacitive sensor 10 may also include more differential capacitor pole-pairs.

The capacitive sensor 10 is connected with a subtraction circuit 70, an adder circuit 20, and a high-frequency (HF) power supply 50. The subtraction circuit 70 is connected with a digital gain stage adjuster 80, and the adder circuit 20 is connected with a comparison circuit 30. The comparison circuit 30 is connected with a digital-analog converter (DAC) 60, and the DAC 60 is connected with a precision voltage source 40. The high-frequency power supply 50 is connected with the comparison circuit 30. The adder circuit 20, the comparison circuit 30, the DAC 60 and the precision voltage source 40 together constitute the gain control adjustment loop of the present invention, and a microprocessor 90 is respectively connected to a digital gain stage adjuster 80, the DAC 60 and a computer 100.

The detection areas 13, 14 of the capacitive sensor 10 are both connected to the subtraction circuit 70. A subtraction is performed in the subtraction circuit 70 on the values obtained at the differential pole-pairs 11, the result of the subtraction is gain-adjusted in the digital gain stage adjuster 80 to get an output position signal or information. The digital gain stage adjuster 80 is connected with the microprocessor 90, and the microprocessor 90 may set variable stage values for the digital gain stage adjuster 80. In the present invention, the digital gain stage adjuster 80 employs a digital potentiometer to conduct selection. To perform gain control of the output position signal, a gain range is firstly selected by the digital gain stage adjuster 80 shown in FIG. 2. Since a digital potentiometer is used to conduct gain amplification, and the precision resistors in the chip of the digital potentiometer are in the same chip, the consistency is very good (temperature is the same), and accordingly, ratio difference resulted from temperature change is very small, usually down to 5 PPM (parts per million).

The displacement detection areas 13 and 14 of the capacitive sensor 10 are connected with the adder circuit 20. The values obtained there are summed in the adder circuit 20 to be used for the gain control adjustment loop. The gain control adjustment loop includes the adder circuit 20, the comparison circuit 30, the DAC 60, and the precision voltage source 40. The adder circuit 20 sums the values obtained at the differential pole-pairs 11 to provide a feedback value to the gain control loop. The microprocessor 90 and the precision voltage source 40 are respectively connected to the DAC 60. The microprocessor 90 may provide the DAC 60 with a variable voltage signal, and the precision voltage source 40 provides a predetermined voltage value. The two voltage values are processed by the DAC 60 so as to provide a target value of control to the gain control loop. The feed-back voltage value output from the adder circuit 20 and the target value output from the DAC 60 are compared in the comparison circuit 30, the result of comparison is provided to the HF power supply 50. The HF power supply 50, whose frequency ranges from 1 MHZ to 500 MHZ, is adapted to provide energy to the common energy emission source surface 12 of the capacitive sensor 10. Generally, the gain control loop is adapted to adjust energy of the HF power supply 50. The control target of the gain control loop is to achieve fine-tuning of the gain of the capacitive sensor 10 by controlling the output energy of the HF power supply 50 on the basis of comparison of a variable voltage signal provided by the DAC 60 with the sum value from the differential capacitive sensor 10. The adjustment precision is very high since the precision of the DAC 60 is very high (usually, the precision is +−½LSB) and there are built-in feedback resistances in the DAC 60. With this innovative control structure, the use of traditional manual ultra-precision potentiometer is avoided, but better adjustment result is achieved.

The microprocessor 90 is connected to a computer 100. The computer 100 controls and sets parameters of the microprocessor 90 with software. The adjustment method of the present invention enables communicating with the computer through an interface, for communication with computer, thereby avoiding open and close of machine cases during adjustment. Furthermore, Since contactless adjustment is adopted for all devices, the service life is prolonged greatly than the traditional high-precision potentiometer scheme. A traditional high-precision potentiometer can usually bear 200 times of adjustment, but the present invention can offer tens of millions times of adjustment, which greatly improves the reliability of the capacitive sensor.

The feasibility of the solution of the present invention is demonstrated as follows:

Provided that Uref is the value provided by the precision voltage source 40, a value Vda is set to the DAC 60 by the computer 100 and the microprocessor 90, Vfull is the full value of the DAC 60, U is the zero-point output of the capacitive sensor 10, ΔU is the variance of U resulted from displacement of the capacitive sensor 10, k is the variable stage selection coefficient of the digital gain stage adjuster 80 set by the microprocessor 90, Uda is the output value of the DAC 60, Upo is the position value output by the digital gain stage adjuster 80, S is the variable angular displacement of the capacitive sensor 10, and Smax is the maximum rotary angle, then the following three formulas can be obtained:

$$Uda = Uref * Vda / Vfull \quad (1)$$

$$(U+\Delta U)+(U-\Delta U)=Uda$$

$$2*U = Uda \quad (2)$$

$$Upo = [(U + \Delta U) - (U - \Delta U)] * k \quad (k \text{ is discrete}) \quad (3)$$
$$= 2 * \Delta U * k$$
$$= 2 * k * U * S / Smax$$

Apply the formulas (1) and (2) to the formula (3), then $$Upo = k * Uda * S / Smax$$
$$= (k * S * Uref * Vda) / (Vfull * Smax)$$

From the above inference, it can be seen that Vda is proportional to Upo. This indicates that it is feasible to use digital-analog converter to conduct gain control of the sum obtained at the differential pole-pairs of the capacitive sensor and more ideal output result can be achieved.

What is claimed is:

1. A method for controlling a capacitive sensor in a vibrating mirror motor system comprising a capacitive sensor, a subtraction circuit and an adder circuit connected with the capacitive sensor, a high-frequency power supply for providing energy to the capacitive sensor, a digital-analog converter, and a digital gain stage adjuster having a digital potentiometer being connected to a microprocessor, wherein the method comprises:

summing, by the adder circuit, values obtained by the capacitive sensor;

comparing, in a comparison circuit, the summed values from the adder circuit with a target gain control value generated by the digital-analog converter;

providing a gain adjustment value to the high-frequency power supply, said gain adjustment value based on the comparing;

outputting a position signal by the digital gain stage adjuster after adjusting a value resulted from the subtraction circuit performing subtraction on values obtained at said capacitive sensor; and before outputting the position signal by the digital gain stage adjuster, setting a stage coefficient of the digital potentiometer by the microprocessor.

2. The method as claimed in claim 1, wherein the capacitive sensor comprises one or more pairs of differential capacitance pole-pairs.

3. The method as claimed in claim 1, wherein the capacitive sensor comprises a common energy emission source surface, a displacement detection area, and an dielectric medium related to the displacement.

4. The method as claimed in claim 2, wherein the capacitive sensor comprises a common energy emission source surface, a displacement detection area, and a dielectric medium related to the displacement.

5. The method as claimed in claim 3, wherein the dielectric medium is ceramic.

6. The method as claimed in claim 4, wherein the dielectric medium is ceramic.

7. The method as claimed in claim 1, wherein a microprocessor is connected to a computer and the computer operates the microprocessor.

8. The method as claimed in claim 7, wherein the digital-analog converter is connected respectively to a precision voltage source and the microprocessor, a voltage value set by the microprocessor and a voltage value provided by the precision voltage source together are input into the digital-analog converter for processing.

9. A circuit for controlling a capacitive sensor in a vibrating mirror motor system comprising: a capacitive sensor, a subtraction circuit and an adder circuit, a high-frequency power supply for providing energy to the capacitive sensor, a digital-analog converter providing a target gain control value for use in tuning the capacitive sensor, and a digital gain stage adjuster having a digital potentiometer;

wherein the capacitive sensor being connected with the subtraction circuit, the adder circuit, and the high-frequency (HF) power supply, the subtraction circuit being connected with the gain stage adjuster.

10. A method for controlling a capacitive sensor in a vibrating mirror motor system comprising:

summing, by an adder circuit, values obtained by the capacitive sensor;

comparing, in a comparison circuit, the summed values from the adder circuit with a target gain control value generated by the digital-analog converter;

providing a gain adjustment value to a high-frequency power supply supplying energy to the capacitive sensor, the gain adjustment value based on the comparing;

outputting a position signal by a digital gain stage adjuster having a digital potentiometer after adjusting a value resulted from the subtraction circuit performing subtraction on values obtained at said capacitive sensor; and before outputting the position signal by the digital gain stage adjuster, setting a stage coefficient of the digital potentiometer by the microprocessor.

* * * * *